(12) United States Patent
Lim et al.

(10) Patent No.: US 10,970,452 B2
(45) Date of Patent: Apr. 6, 2021

(54) SYSTEM FOR DESIGNING SEMICONDUCTOR CIRCUIT AND OPERATING METHOD OF THE SAME

(71) Applicant: Samsung Electronics Co., Ltd., Suwon-si (KR)

(72) Inventors: Kyounghwan Lim, Seoul (KR); Hyungock Kim, Seoul (KR); Heeyeon Kim, Seoul (KR); Dongkwan Han, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 16/795,947

(22) Filed: Feb. 20, 2020

(65) Prior Publication Data

US 2021/0012053 A1    Jan. 14, 2021

(30) Foreign Application Priority Data

Jul. 12, 2019   (KR) .......................... 10-2019-0084231

(51) Int. Cl.
*G06F 30/392*    (2020.01)
(52) U.S. Cl.
CPC ................... *G06F 30/392* (2020.01)
(58) Field of Classification Search
CPC ................................................... G06F 30/392
USPC ........................................................ 716/124
See application file for complete search history.

(56) References Cited

U.S. PATENT DOCUMENTS

| 5,926,632 | A | 7/1999 | Kawaguchi |
| 6,031,979 | A | 2/2000 | Hachiya |
| 6,480,991 | B1* | 11/2002 | Cho ...................... G06F 30/392 716/122 |
| 6,851,099 | B1* | 2/2005 | Sarrafzadeh .......... G06F 30/392 716/123 |
| 6,865,726 | B1 | 3/2005 | Igusa et al. |
| 6,961,916 | B2 | 11/2005 | Sarrafzadeh et al. |
| 7,219,048 | B1* | 5/2007 | Xu ....................... G06F 30/3312 703/19 |
| 7,506,278 | B1* | 3/2009 | Rjimati ................. G06F 30/327 716/104 |

(Continued)

FOREIGN PATENT DOCUMENTS

| JP | 2830838 B2 | 9/1998 |
| JP | 2954074 B2 | 9/1999 |
| JP | 3251792 B2 | 1/2002 |

*Primary Examiner* — Suresh Memula
(74) *Attorney, Agent, or Firm* — Harness, Dickey & Pierce, P.L.C.

(57) ABSTRACT

Provided are a system for designing a semiconductor circuit and an operating method of the same. The system includes a working memory loading a clustering application for generating a cluster, based on instances respectively corresponding to cells of the semiconductor circuit, and loading a design tool for placing the cells. The clustering application, when an output terminal of a first instance is connected to a second instance and the number of instances connected to the output terminal of the first instance is one, classifies the first instance and the second instance into a candidate group pair. The clustering application, when all instances connected to an input terminal of the second instance are classified into the candidate group pair with the second instance, generates the cluster including the first instance and the second instance.

20 Claims, 11 Drawing Sheets

(56) References Cited

U.S. PATENT DOCUMENTS

| | | |
|---|---|---|
| 7,730,431 B2 | 6/2010 | Kitano |
| 7,941,776 B2 | 5/2011 | Majumder et al. |
| 8,201,125 B1 * | 6/2012 | Jang ................. G06F 30/34 |
| | | 716/116 |
| 8,448,105 B2 | 5/2013 | Dimou et al. |
| 8,826,211 B1 * | 9/2014 | Sood ................ G06F 30/394 |
| | | 716/113 |
| 10,216,546 B1 | 2/2019 | Davison et al. |
| 10,417,374 B1 * | 9/2019 | Iyer .................. G06F 30/327 |
| 10,740,517 B1 * | 8/2020 | Amaru ............... G06F 30/327 |
| 2003/0233628 A1 * | 12/2003 | Rana ................ G06F 30/30 |
| | | 716/103 |
| 2007/0271543 A1 * | 11/2007 | Alpert ............... G06F 30/18 |
| | | 716/114 |
| 2015/0007120 A1 * | 1/2015 | Erickson ............ G06F 30/34 |
| | | 716/105 |
| 2015/0100936 A1 * | 4/2015 | Chuang .............. G06F 30/327 |
| | | 716/114 |
| 2016/0232275 A1 * | 8/2016 | Dixon ............... G06F 30/392 |
| 2018/0165400 A1 * | 6/2018 | Feld ................. G06F 30/392 |
| 2019/0188352 A1 * | 6/2019 | Kim ................. G06F 30/327 |
| 2020/0074019 A1 * | 3/2020 | Amaru ............... G06F 30/327 |

* cited by examiner $ZZ = f3(f1(AA, BB), f2(CC, DD))$   $ZZ = f4(AA, BB, CC, DD)$

SYSTEM FOR DESIGNING SEMICONDUCTOR CIRCUIT AND OPERATING METHOD OF THE SAME

CROSS-REFERENCE TO RELATED APPLICATIONS

This U.S. non-provisional patent application claims priority under 35 U.S.C. § 119 of Korean Patent Application No. 10-2019-0084231, filed on Jul. 12, 2019, the entire contents of which are hereby incorporated by reference.

BACKGROUND

Example embodiments of inventive concepts relate to a design of a semiconductor circuit, and more particularly, to a system for designing a semiconductor circuit and/or an operating method of the same.

Generally, a design of a schematic circuit is made for a design of a semiconductor integrated circuit. The schematic circuit represents each device included in the semiconductor integrated circuit, along with a connection relation among devices. These devices may be defined as standard cells that are managed in a cell library. The standard cells included in the schematic circuit may be placed by an Electronic Design Automatic (EDA) tool, and may be designed as patterns of material layers such as conductive layers, semiconductor layers, and/or insulating layers. Then, a layout in which the respective patterns are placed, e.g. placed on a two-dimensional layer extending in two different directions vertically and horizontally may be designed. Based on this layout, a semiconductor integrated circuit having desired functions may be fabricated.

As electronic devices that have various purposes and functions have been developed, the number of cells required for a semiconductor circuit increases, and nets, e.g. the corresponding connections, of these cells are also complicated. Although the EDA tool provides algorithm that can automatically design numerous cells and nets, as the number of cells and nets increases, an optimization of placement is not achieved. Accordingly, there is a need for a methodology that enables miniaturization and quality improvement of the semiconductor circuit by optimizing, or improving, placement of the cells.

SUMMARY

Example embodiments of inventive concepts provide a system for designing a semiconductor circuit and/or an operating method of the same, which may optimize or improve placement of cells to reduce an area and a length of a wiring of the semiconductor circuit, and improve the performance.

According to some example embodiments, a system for designing a semiconductor circuit includes a working memory configured to load machine-readable instructions for generating a cluster, based on instances respectively corresponding to cells of the semiconductor circuit, and for placing the cells; and a central processing unit configured to execute the machine-readable instructions for clustering and placing that, when executed by the central processing unit, cause the system to, in response to an output terminal of a first instance being connected to a second instance and a number of instances connected to the output terminal of the first instance being one, classify the first instance and the second instance into a candidate group pair, and in response to all instances connected to an input terminal of the second instance being classified into the candidate group pair with the second instance, generate the cluster including the first instance and the second instance and provide the design tool with the cluster.

According to some example embodiments, a method of operating a system for designing a semiconductor circuit includes receiving a netlist including instances respectively corresponding to cells of the semiconductor circuit, classifying, in response to the number of a first instance that is connected to an output terminal of a second instance being one, the first instance and the second instance into a candidate group pair, determining whether at least one instance connected to an input terminal of the first instance is classified into the candidate group pair together with the first instance, and determining a target instance that is included in the cluster, based on a determined result of the at least one instance.

According to some example embodiments, a method of operating a system for designing a semiconductor circuit includes receiving a netlist that includes instances respectively corresponding to cells of the semiconductor circuit and nets connecting the instances, generating a directed graph such that each of the nets is connected between two instances and has a directionality corresponding to a signal transfer direction of the instances, classifying, in response to the number of nets connected to an output terminal of a first instance of the instances being one, the net into a candidate group net, generating a cluster including the first instance and a second instance connected to the net, in response to all nets connected to an input terminal of the second instance being classified as the candidate group net, and placing a first cell corresponding to the first instance and a second cell corresponding to the second instance adjacent to each other, based on the cluster.

BRIEF DESCRIPTION OF THE FIGURES

The above and other objects and features of inventive concepts will become apparent by describing in detail some example embodiments thereof with reference to the accompanying drawings.

DETAILED DESCRIPTION OF EXAMPLE EMBODIMENTS

Example embodiments of inventive concepts will be described below clearly and in detail, such that those of ordinary skill in the art can easily practice inventive concepts.

Figure 1:
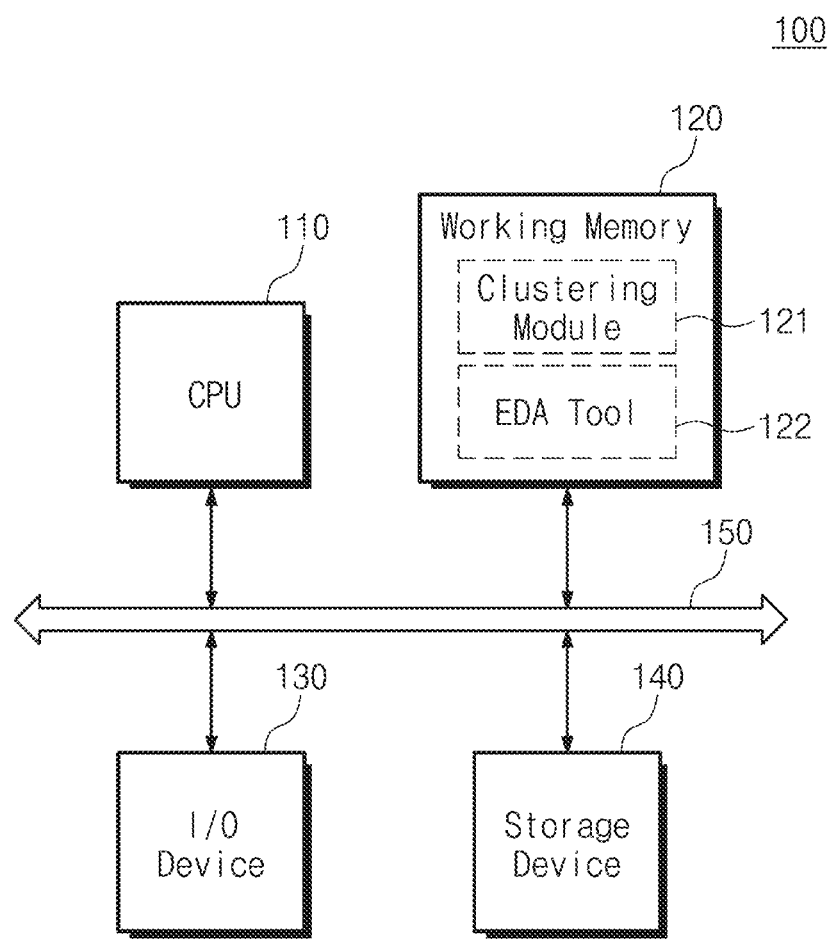
FIG. 1 is a block diagram illustrating a system for designing a semiconductor circuit according to an example embodiment of inventive concepts.

FIG. 1 is a block diagram illustrating a system for designing a semiconductor circuit according to an example embodiment of inventive concepts. Referring to FIG. 1, a system 100 for designing a semiconductor circuit may include a CPU 110, a working memory 120, an input/output device 130, a storage device 140, and a system interconnector 150. In an example embodiment, the system 100 may be provided as a dedicated device for a clustering of inventive concepts and a design of the semiconductor circuit using the clustering, but inventive concepts are not limited thereto. For example, the system 100 may be implemented as a computer system having clustering and design program. Furthermore individual components of the system 100 may be integrated into a same physical system, and other components of the system 100 may be integrated while other components may not be in physical proximity to one another. For example, the storage device 140 may be integrated in a same personal computer as the CPU 110; however, inventive concepts are not limited thereto.

The CPU 110 may execute software such as application programs, an operating system, and/or device drivers to be performed in the system 100. The CPU 110 may execute the operating system (OS, not illustrated) loaded into the working memory 120. The CPU 110 may execute various application programs to be driven based on the operating system (OS). In some example embodiments, the CPU 110 may execute a clustering module or clustering module 121 and a design tool 122 (e.g., an EDA tool), which are loaded in the working memory 120. Although the clustering application 121 and the design tool 122 are shown separately in FIG. 1, inventive concepts are not limited thereto, and there may be a single application that performs functions of both the clustering application 121 and the design tool 122. Further, although not illustrated, the CPU 110 may further execute a simulation program, such as a Simulation Program with Integrated Circuit Emphasis (SPICE) program, for simulating the semiconductor circuit that is designed by the design tool 122.

The operating system (OS) or the application programs may be loaded in the working memory 120. When the system 100 boots, an OS image (not illustrated) stored in the storage device 140 may be loaded into the working memory 120, based on a boot sequence. The operating system (OS) may support all input and output operations of the system 100. Likewise, the application programs may be loaded into the working memory 120 to provide a basic service or a service selected by a user. In particular, the clustering application 121 for performing the clustering of inventive concepts and the design tool 122 for placement and routing of the semiconductor circuit may be loaded into the working memory 120 from the storage device 140.

The working memory 120 may be or include a volatile memory such as a static random access memory (SRAM) and/or a dynamic random access memory (DRAM), and/or may be or include a nonvolatile memory such as a PRAM, an MRAM, a ReRAM, a FRAM, a NOR flash memory, and/or the like.

The clustering application 121 may analyze a netlist of the semiconductor circuit (schematic circuit) and cluster the cells having a specific condition. The schematic circuit represents the devices, e.g. the active and passive devices, of the semiconductor circuit, along with a connection relation of the devices, and the devices may be defined as standard cells provided in a cell library. The netlist may include instances corresponding to each of the cells of the semiconductor circuit and nets representing the connection relation between the instances.

The clustering application 121 may determine a directionality of the nets, based on an input terminal (input information) and an output terminal (output information) of the instances. In reference to the nets, the directionality corresponds to a transfer direction of a signal, e.g. a transfer direction of a signal from an output terminal of one cell to an input terminal of another cell. The clustering application 121 may generate a directed graph for the semiconductor circuit, based on the determined directionality. In the directed graph, each of the nets may connect two instances, e.g. two cells, and may have directionality from the output terminal to the input terminal. The directed graph may include a cycle, or, alternatively, the directed graph may be a directed acyclic graph (DAG). The clustering application 121 may determine instances, e.g. cells, to be included in the cluster with reference to the directed graph.

The clustering application 121 may detect instances that have a strong relation from the directed graph. Herein, the strong relation may mean that the output terminal of one instance is only connected to the input terminal of another instance through the net. For example, the number of instances to which an output terminal of one instance is connected may correspond to the out-degree of the instance, and two instances being in a strong relation may indicate that the out-degree of one of the instances is one, and the output terminal of the one instance is connected to the input terminal of the other instance. The strong relation will be described in more detail, through the directed graph of FIG. 4. The cells corresponding to instances that have the strong relation may be placed, e.g. may be placed on photomasks to be patterned on the semiconductor circuit, adjacent to or close to one another. When the cells are adjacent to or close to one another, a wiring length may be reduced, and influence of signal delay, e.g. a signal delay associated with a high RC time constant, and/or the like may be reduced.

Alternatively, when the output terminal of one instance is connected to input terminals of a plurality of other instances, the signal transfer path is divided into a plurality. For example, in a case when the out-degree of an instance is greater than one, the signal transfer path may be divided into a plurality. Accordingly, a calculation may be required or may be done to determine which cell in the signal transfer path should be placed adjacent to the cell branching the signal transfer path, based on information such as a timing criticality. When cell placement may be varied by other factors, such as considering a divided signal transfer path as a whole and/or timing information such as the timing criticality, the clustering application 121 may not classify the instances as having the strong relation.

The clustering application 121 may determine instances to be included in the cluster among instances that are classified as having the strong relation. In some example embodiments, the clustering application 121 may track candidate group instance pairs having the strong relation with reference to the directed graph, and include pairs that have the same instance among the candidate group instance pairs, in one cluster. Details of determining the cluster will be described later. The clustering application 121 may provide the design tool 122 with the generated cluster.

In FIG. 1, although the clustering application 121 is illustrated as being implemented separately from the design tool 122, but inventive concepts is not limited thereto. For example, the clustering application 121 may be implemented together in the design tool 122, and the design tool 122 may perform clustering in a manner according to an example embodiment of inventive concepts.

The design tool 122 (e.g., an EDA tool) may place the cells, based on the netlist and the cluster, onto a layout, and may perform a routing, e.g. may perform a routing connecting the cells. The design tool 122 may perform a Place and Route stage of design automation. A cell library that represents the cells of the semiconductor circuit in a layout, may be defined in the design tool 122. The layout may be a procedure that defines shape or size of a pattern for configuring transistors and wirings, which are to be formed on a semiconductor substrate. The layout of a particular layer of the semiconductor device may be used for production of a photomask that are used in fabrication of the semiconductor device. For example, the layout of layers may be written to photomasks used in the fabrication of the semiconductor device. Details of fabrication of a semiconductor device will be described later with reference to FIG. 14. Among the standard cells defined in the cell library, a cell suitable for the semiconductor circuit may be selected, and the selected cell may be placed by the design tool 122. Furthermore, the routing for the cells that are placed by the design tool 122 may be performed. These procedures may be performed automatically and/or manually, by the design tool 122, along with input of operator, such as input of a layout engineer.

The cells corresponding to the instances that are included in the cluster may be placed adjacent to, or close to, one another by the design tool 122. For example, the design tool 122 may set a boundary of the cluster, and may place the cells corresponding to the cluster within the set boundary, e.g. may be placed within a two-dimensional bounding box. For example, the design tool 122 may set an origin coordinate corresponding to the cluster, and the cells corresponding to the cluster may move according to movement of an origin point. As a result, the cells having the strong relation described above may be placed adjacently or close to one another, the area and the length of the wiring of the semiconductor circuit may be reduced, and an improved frequency, e.g. a maximum frequency characteristic and/or a total negative slack (TNS) characteristic of the semiconductor circuit may be improved.

The input/output device 130 controls a user input and a user output from user interface devices. For example, the input/output device 130 may receive a netlist file or the like, and may include a keyboard or a monitor (not shown). For example, the input/output device 130 may display the directed graph or a clustering result, which are generated by the clustering application 121, and/or the layout and a routing result by the design tool 122.

The storage device 140 is provided as a storage medium of the system 100. The storage device 140 may store application programs, an operating system image, and various data. The storage device 140 may be provided as a memory card such as an MMC, an eMMC, a SD, a MicroSD, etc. and/or a hard disk drive (HDD). The storage device 140 may include a NAND-type flash memory having a large storage capacity. Alternatively or additionally, the storage device 140 may include a next generation nonvolatile memory such as a PRAM, an MRAM, a ReRAM, a FRAM, or a NOR flash memory.

The system interconnector 150 may be or may include a system bus for providing a network inside the system 100. Through the system interconnector 150, the CPU 110, the working memory 120, the input/output device 130, and the storage device 140 may be electrically connected and exchange data with one another. However, the configuration of the system interconnector 150 is not limited to the above description, and other mechanisms for effective management may be further included.

Figure 2:
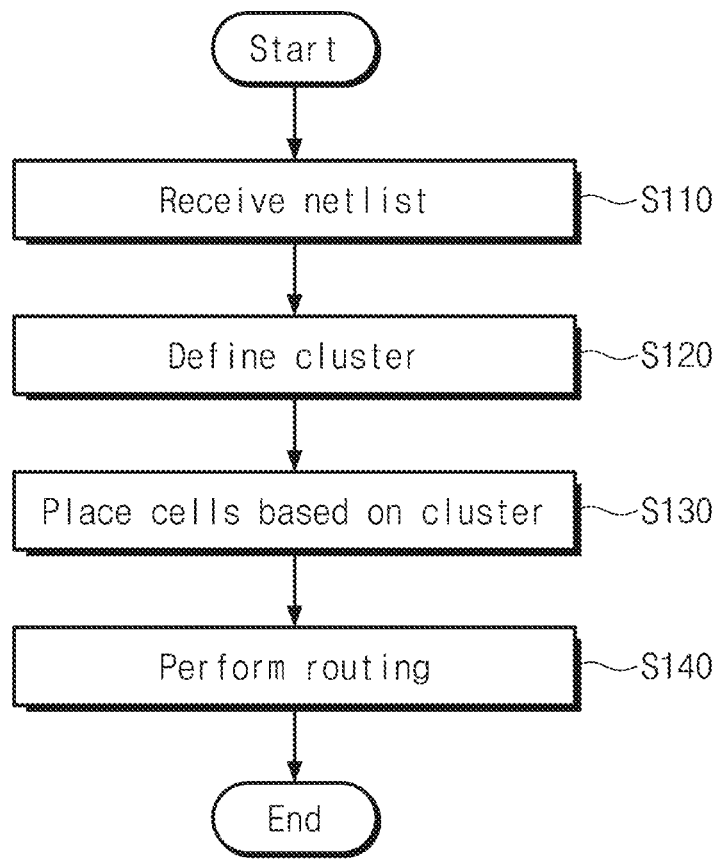
FIG. 2 is a flowchart of a method for designing a semiconductor circuit by a system of FIG. 1.

FIG. 2 is a flowchart of a method for designing a semiconductor circuit by a system of FIG. 1. Operations of FIG. 2 may be performed by the system 100 for designing the semiconductor circuit of FIG. 1. For convenience of description, FIG. 2 will be described with reference to the numerals of FIG. 1.

In operation S110, the system 100 may receive the netlist. For example, the system 100 may receive the netlist that is created by the user. The user may create the netlist and/or provide a previously created netlist to the system 100, through the input/output device 130. However, inventive concepts is not limited thereto. For example, a previously created netlist file may be stored in the storage device 140, the stored netlist may be provided to the working memory 120 by the input/output device 130. The netlist may include instances and nets, which correspond to the cells of the semiconductor circuit.

In operation S120, the system 100 may define the cluster, based on the netlist. The cluster may be defined by the clustering application 121 that is loaded in the working memory 120. As described with reference to FIG. 1, the clustering application 121 may generate the directed graph, based on input information and output information of each instance. The clustering application 121 may classify instance pairs having the strong relation into a candidate group with reference to the directed graph. The clustering application 121 may determine instances to be included in the cluster by tracking the instance pairs that are classified as the candidate group.

In operation S130, the system 100 may place the cells, based on the cluster that is defined in operation S120. Placement of the cells may be performed by the design tool 122 that is loaded in the working memory 120. The design tool 122 may place the cells automatically or at least partially manually, based on its design rules. An operator, for example a layout engineer, may manually place at least some of the cells. The design tool 122 performs overall placement of cells, based on the netlist, but may consider clusters. The design tool 122 may place the cells included in the cluster adjacent to, or close to, one another. The design tool 122 may set the boundary of the cluster and/or set the origin coordinate to induce adjacent placement of cells in the cluster.

In operation S140, the system 100 may perform routing for the placed cells. The routing may be performed by the design tool 122 that is loaded in the working memory 120. The design tool 122 may connect the placed cells with one another based on the netlist. Additionally or alternatively, the design tool 122 may form a pin pattern in the cells, based on heating information that is generated as a result of the routing.

Although not illustrated, after operation S140, a verification of the designed layout may be performed. For example, a Design Rule Check (DRC), which verifies that the layout is correct for design rules, an Electronic Rule Check (ERC), which verifies that the internal electronics are properly connected, and/or a LVS (Layout vs Schematic), which checks that the layout matches a gate level netlist, may be performed.

Figure 3:
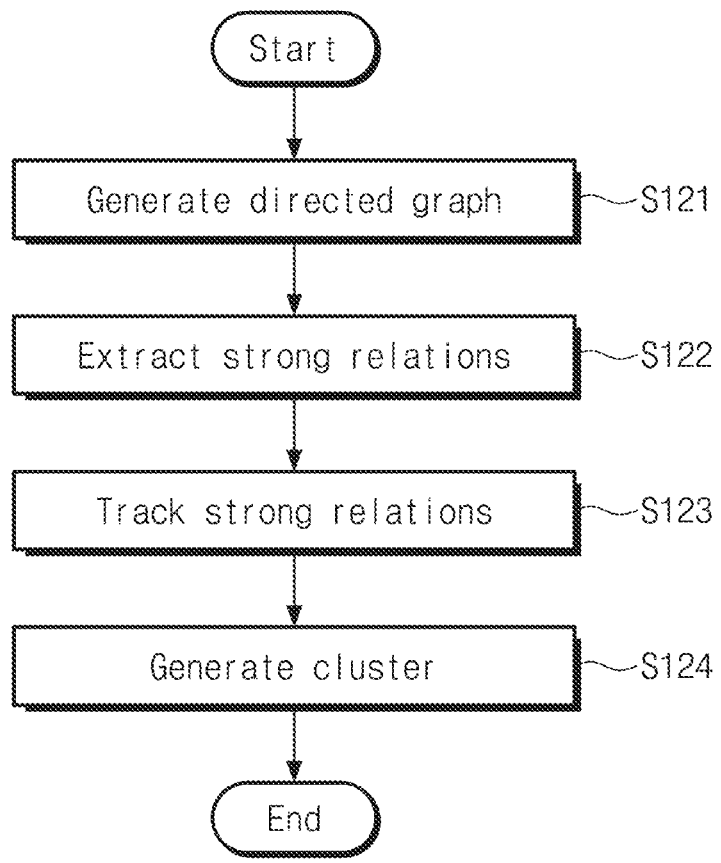
FIG. 3 is an example flowchart embodying operation S120 of FIG. 2.

FIG. 3 is a non-limiting example flowchart embodying operation S120 of FIG. 2. FIG. 3 illustrates operations, which may be performed by the system 100 of FIG. 1, of defining the cluster based on the netlist. For convenience of description, FIG. 3 will be described with reference to the numerals of FIG. 1.

In operation S121, the clustering application 121 generates the directed graph. The clustering application 121 may determine the directionality of the nets, based on the input terminal and the output terminal of the instances that are included in the netlist. In the directed graph, each of the nets connects two different instances. One net is connected between the output terminal of the first instance and the input terminal of the second instance.

In operation S122, the clustering application 121 may extract the instances having the strong relation from the directed graph. As described above, when the output terminal of the first instance is only connected to the input terminal of the second instance through the net and is not connected to the input terminal of other instances, the first instance and the second instance may be determined to have the strong relation. That is, when the out-degree of the first instance is one, and the output terminal of the first instance is connected to the input terminal of the second instance, the first and second instance may be determined to have the strong relation. Conversely, when the output terminal of the first instance is connected to the input terminals of a plurality of instances through a plurality of nets, the first instance and the second instance do not have the strong relation. That is, when the out-degree of the first instance is more than one, and the output terminal of the first instance is connected to a plurality of other instances, the first instance and the plurality of other instances may be determined to not have a strong relation.

For example, the clustering application 121 may classify an instance pair (e.g., the first instance and the second instance) having the strong relation as the candidate group pair. The instances that are included in the candidate group pair have a potential that may be included in later created clusters. For example, the clustering application 121 may classify nets for connecting the instance pair that has the strong relation, as candidate group nets. The instances that are connected to the candidate group net have a potential that may be included in later created clusters.

In operation S123, the clustering application 121 tracks the candidate group pair or the candidate group net, which have the strong relation. The clustering application 121 may search for a duplicate instance among the instance pairs that are classified as the candidate group pair, with reference to the directed graph. For example, when the first instance pair includes the first instance and the second instance, and the second instance pair includes the second instance and a third instance, the second instance may be a duplicate instance. The clustering application 121 may track whether other instances connected to the first to third instances are classified as the candidate group pair in correspondence with any one of the first to third instances. As a result of the tracking, the instances that are included in the cluster may be determined.

In operation S124, the clustering application 121 may generate at least one cluster, based on the tracking result of the candidate group pair or the candidate group net. The clustering application 121 may include the instances included in the candidate group pair and/or the instances connected to the candidate group net, in one cluster. For example, when the output terminal of the first instance and the input terminal of the second instance are connected and classified into one candidate group pair, the first and second instances may be included together in one cluster. However, when the input terminal of the second instance is connected to the output terminal of the third instance, and the second and third instances are not classified as the candidate group pair, the first and second instances may not be included in one cluster. Detailed description thereof will be described later.

Figure 4:
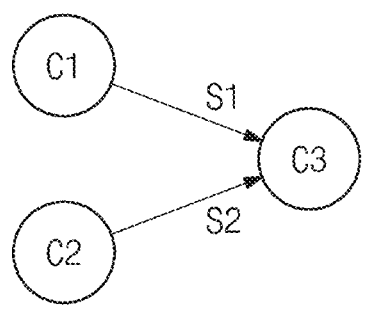
FIGS. 4 and 5 are diagrams for describing directed graphs for clustering described in FIGS. 1 to 3 and for describing classification of candidate groups that have a strong relation.
Figure 5:
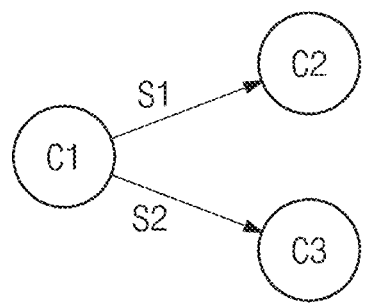

FIGS. 4 and 5 are diagrams for describing directed graphs for clustering described in FIGS. 1 to 3 and for describing classification of candidate groups that have a strong relation. FIGS. 4 and 5 will be understood as example directed graphs generated based on instance of the netlist and the net. Cells C1, C2, C3, which are circular in FIGS. 4 and 5, respectively correspond to instances of the netlist, and the paths S1 and S2 respectively correspond to nets of the netlist. For convenience of explanation, it is assumed that there is no connection relation other than the connection relation illustrated.

Referring to FIG. 4, a first cell C1 is connected to a third cell C3 through a first path S1. A second cell C2 is connected to the third cell C3 through a second path S2. The first path S1 has a directionality from the first cell C1 to the third cell C3. The second path S2 has a directionality from the second cell C2 to the third cell C3. This connection relation may be provided from the netlist. The system 100 may determine the directionality of a first net and a second net, based on the input information or the output information of the instances.

In an example embodiment, the output information (an output terminal, an output pin, an output port, etc.) of the first instance in the netlist may indicate the first net and/or the second instance. In an example embodiment, the output information of the second instance in the netlist may indicate the second net and/or the first instance. In an example embodiment, the input information of the third instance in the netlist may indicate the first and second nets and/or the first and second instances. Accordingly, the system 100 may generate the directed graph as illustrated in FIG. 4 with reference to the netlist.

As illustrated in FIG. 5, the number of signal transfer paths output from the first cell C1 or the second cell C2 is one; that is, the out-degree of the first cell C1 is one and the out-degree of the second cell C2 is one. When the first cell C1 and/or the second cell C2 is placed adjacent to the third cell C3, the wiring length may be reduced and the influence of signal delay or the like may be reduced. Referring to the directed graph of FIG. 4, the signal transfer paths are not branched but are gathered as one. Thus, the possibility of changing the placement of the cells, based on other factors, such as considering the timing criticalities of the various paths, may be reduced.

As a result, it may be determined that the first cell C1 and the third cell C3 have the strong relation. The instance pair including the first instance and the third instance may be classified as the candidate group pair for the clustering. Similarly, the second cell C2 and the third cell C3 may be determined as cells that have the strong relation. The instance pair including the second instance and the third instance may be classified as the candidate group pair for the clustering. Furthermore, the first to third instances may be included in one cluster.

Referring to FIG. 5, a first cell C1 is connected to a second cell C2 through a first path S1. The first cell C1 is connected to a third cell C3 through a second path S2. The first path S1 has a directionality from the first cell C1 to the second cell C2. The second path S2 has a directionality from the first cell C1 to the third cell C3. In an example embodiment, the output information of the first instance may indicate the first and second nets and/or the second and third instances. In an example embodiment, the input information of the second instance may indicate the first net and/or the first instance. In an example embodiment, the input information of the third instance may indicate the first net or the first instance.

A plurality of signal transfer paths are provided from the output terminal of the first cell C1. That is, an out-degree of the first cell C1 is greater than one. In above case, whether which cell of the second cell C2 and the third cell C3 should be placed adjacent to the first cell C1, may be determined based on the timing criticality corresponding to the first path S1 and/or the timing criticality corresponding to the second path S2. For example, when a time corresponding to the first path S1 is critical than a time corresponding to the second path S2, the second cell C2, rather than the third cell C3, may be placed closer to the first cell C1. This timing criticality may be calculated in consideration of not only the second cell C2 and the third cell C3, but also other cells that are connected to the output terminal of the second cell C2 or the output terminal of the third cell C3, and their connections.

As a result, it may be determined that the first cell C1 and the second cell C2 do not have the strong relation. The instance pair including the first instance and the second instance may not be classified as the candidate group pair for the clustering. As in the above description, it may be determined that the first cell C1 and the third cell C3 do not have the strong relation. The instance pair including the first instance and the third instance may not be classified as the candidate group pair for the clustering. In addition, the first to third instances may not be included in one cluster.

Figure 6:
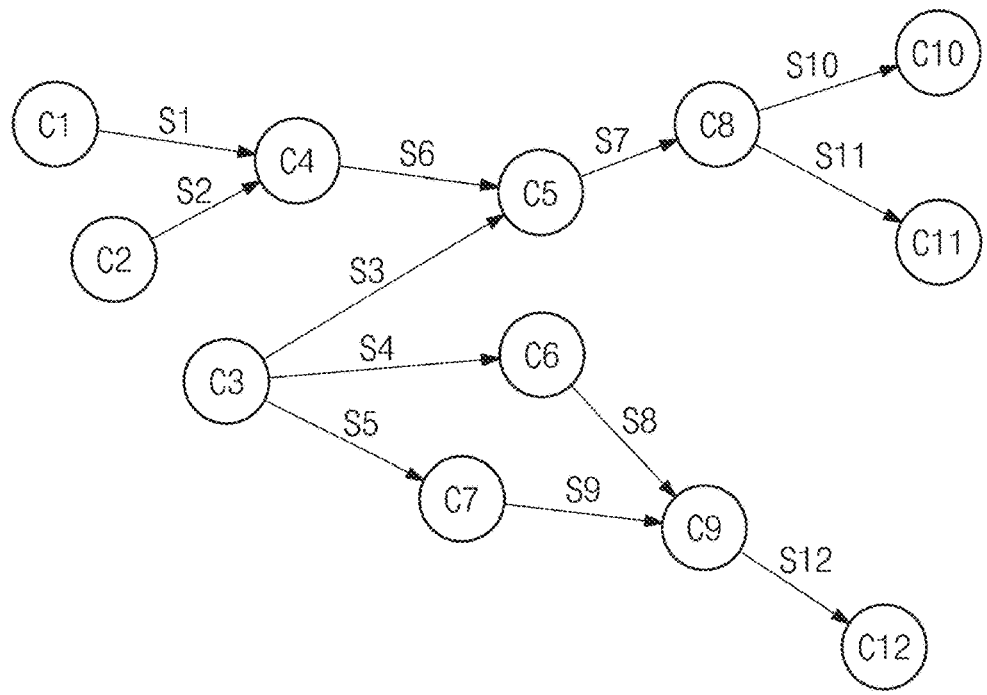
FIG. 6 is a diagram for describing operation S121 of FIG. 3.

FIG. 6 is a diagram for describing operation S121 of FIG. 3. FIG. 6 is a non-limiting example directed graph that is generated based on the netlist. Although the directed graph illustrated in FIG. 6 is acyclic, inventive concepts are not limited thereto, and the directed graph may include a cycle. Operations of generating clustering, based on the directed graph illustrated in FIG. 6 will be described below with reference to FIGS. 7 to 9. First to twelfth cells C1 to C12 and first to twelfth paths S1 to S12 have a connection relation as illustrated in FIG. 6. As described above, the directed graph of FIG. 6 may be generated based on the input information and the output information of instances that are included in the netlist. The connection relation of each of the cells C1 to C12 may be defined in instances of the netlist.

Hereinafter, for convenience of description, it will be understood that the first to twelfth cells C1 to C12 correspond to the first to twelfth instances, respectively, and the first to twelfth paths S1 to S12 correspond to the first to twelfth nets, respectively. The first to twelfth cells C1 to C12 may also be described as vertices of the directed graph, and the first to twelfth paths S1 to S12 may also be described as edges of the directed graph.

Figure 7:
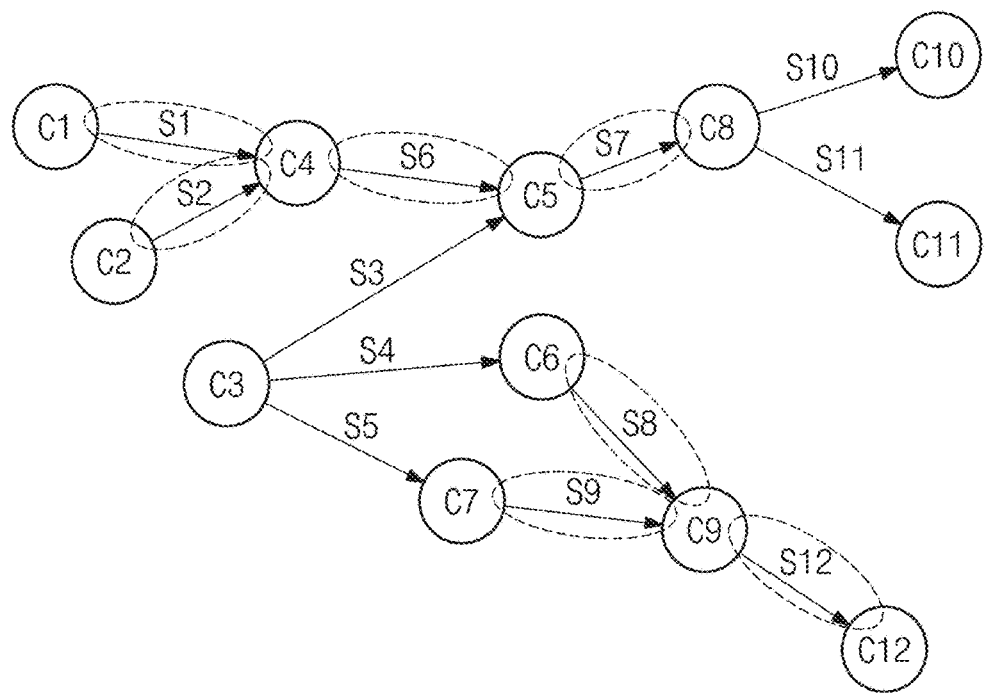
FIG. 7 is a diagram for describing operation S122 of FIG. 3.

FIG. 7 is a diagram for describing operation S122 of FIG. 3. FIG. 7 is a diagram for describing the strong relation, that is, extraction of the candidate group pair or extraction of the candidate group net from the directed graph of FIG. 6. The clustering application 121 of FIG. 1, when the output terminal of one instance is only connected to the input terminal of another instance through the net, may determine the corresponding instance pair as the candidate group pair or the candidate group net. Dotted lines illustrated in FIG. 7 are for emphasizing the strong relation. That is, dotted lines illustrated in FIG. 7 correspond to cells that are in a strong relation.

As a result, referring to FIG. 7, cells that are connected through a first path S1, a second path S2, a sixth path S6, a seventh path S7, an eighth path S8, a ninth path S9, and a twelfth path S12, have the strong relation. That is, a first net, a second net, a sixth net, a seventh net, an eighth net, a ninth net, and a twelfth net may be classified as the candidate group nets. For example, {C1, C4}, {C2, C4}, {C4, C5}, {C5, C8}, {C6, C9}, {C7, C9}, {C9, C12} may be classified as the candidate pairs. That is, the ordered pairs of cells or vertices (C1, C4), (C2, C4), (C4, C5), (C5, C8), (C6, C9), (C7, C9), (C9, C12) according to the illustrative non-limiting example embodiment of FIG. 7 may correspond to the candidate group nets.

Since the output terminal of a third cell C3 is connected to a fifth cell C5, a sixth cell C6, and a seventh cell C7, the third cell C3 is determined not to have the strong relation with the fifth cell C5, the sixth cell C6, and the seventh cell C7. That is, the out-degree of the third cell is greater than one, and no strong relation with the fifth cell C5, the sixth cell C6, and the seventh cell C7 is determined. In addition, since the output terminal of an eighth cell C8 is connected to a tenth cell C10 and an eleventh cell C11, the eighth cell C8 is determined not to have the strong relation with the tenth cell C10 and the eleventh cell C11. That is, the out-degree of the eight cell C8 is greater than one, and no strong relation with the tenth cell C10 and the eleventh cell C11 is determined.

Figure 8:
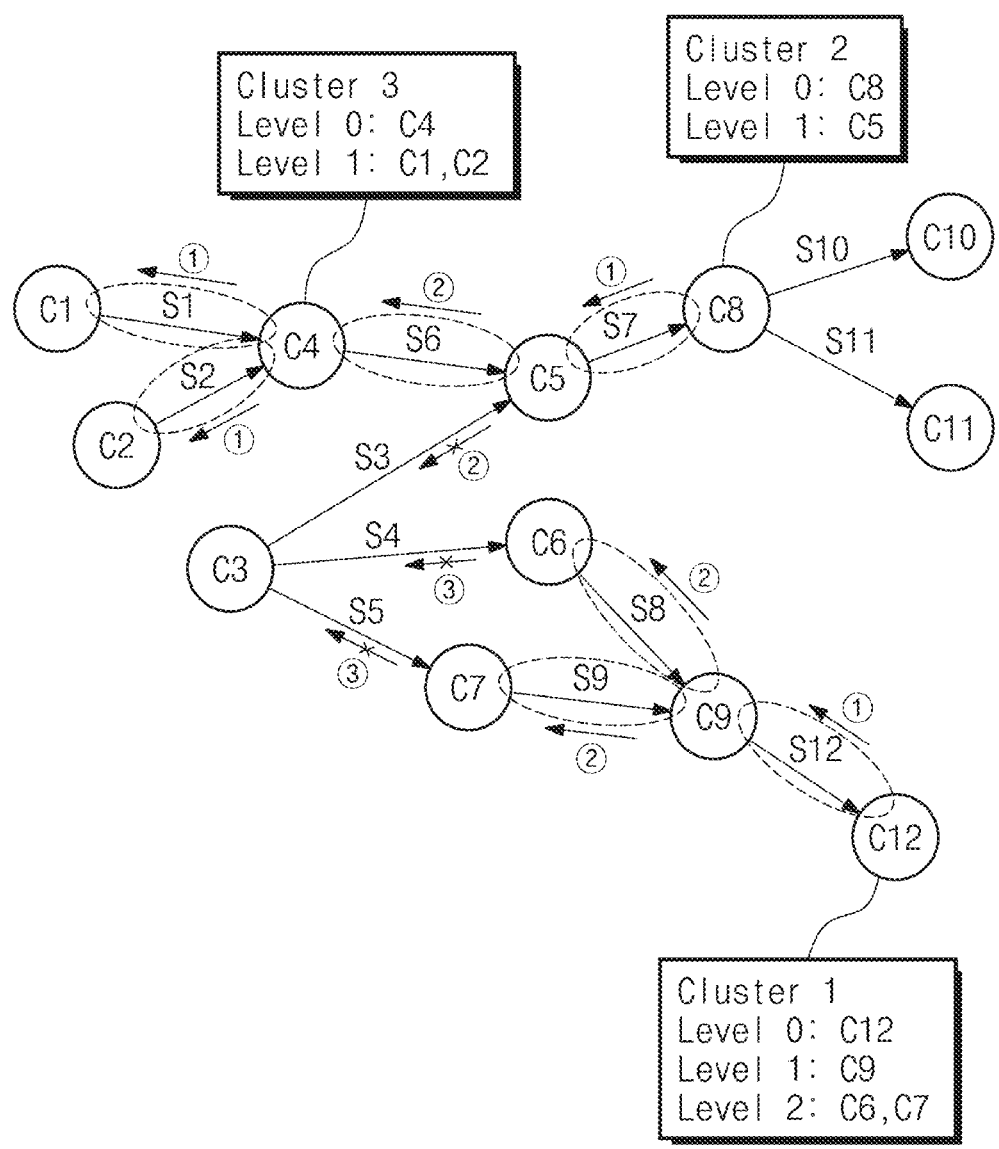
FIG. 8 is a diagram for describing operation S123 of FIG. 3.

FIG. 8 is a diagram for describing operation S123 of FIG. 3. FIG. 8 is a diagram for describing a process of determining the instance included in the cluster by tracking the candidate group pair (or the candidate group net) extracted in FIG. 7 in the directed graph of FIG. 6. The clustering application 121 of FIG. 1 may determine the cluster by tracking the candidate group pair in a reverse direction of the signal transfer direction of the directed graph. That is, the tracking may start from a tenth cell C10, an eleventh cell C11, and a twelfth cell C12, which correspond to an end instance.

Since the twelfth cell C12 has the strong relation with a ninth cell C9, a twelfth instance and a ninth instance are included in a first cluster. The twelfth cell C12 may be recorded at level 0 of the first cluster, and the ninth cell C9 may be recorded at level 1 of the first cluster. Next, the ninth cell C9 has the strong relation with a sixth cell C6 and a seventh cell C7. Since all cells that are connected to the input terminal of the ninth cell C9 have the strong relation with the ninth cell C9, a sixth instance and a seventh instance are included in the first cluster. The sixth cell C6 and the seventh cell C7 may be recorded at level 2 of the first cluster.

The sixth cell C6 does not have the strong relation with a third cell C3. The seventh cell C7 does not have the strong relation with the third cell C3. Therefore, the third cell C3 is not included in the first cluster. As a result, instances included in the first cluster are determined, and no more cells are recorded in the first cluster.

Since the tenth cell C10 and the eleventh cell C11 do not have the strong relation with an eighth cell C8, they are not included in the cluster. The eighth cell C8 has the strong relation with a fifth cell C5. Thus, an eighth instance and a fifth instance are included in a second cluster. The eighth cell C8 is recorded at level 0 of the second cluster, and the fifth cell C5 is recorded at level 1 of the second cluster.

The fifth cell C5 has the strong relation with a fourth cell C4. However, the fifth cell C5 does not have the strong relation with the third cell C3. Since all cells that are connected to the input terminal of the fifth cell C5 do not have the strong relation, a fourth instance and a third instance are not included in the second cluster. As a result, instances included in the second cluster are determined, and no more cells are recorded in the second cluster.

The fourth cell C4 has the strong relation with a first cell C1 and a second cell C2. Since all cells that are connected to the input terminal of the fourth cell C4 have the strong relation with the fourth cell C4, the fourth instance, a first instance, and a second instance are included in a third cluster. The fourth cell C4 may be recorded at level 0 of the third cluster. The first cell C1 and the second cell C2 may be recorded at level 1 of the third cluster.

For example, in operation S123, the clustering application 121 of FIG. 1 tracks cells having the strong relation in the reverse direction of the directed graph, and include the cells (instances) in the cluster, when the cells have the strong relation. In addition, when all cells that are connected to the input terminal of a certain cell in the cluster have the strong relation, all cells (instances) together with the certain cell may be included in the cluster. When at least one cell that is connected to the input terminal of the certain cell does not have the strong relation, all the cells that are connected to the input terminal of the certain cell may not be included in the cluster.

Figure 9:
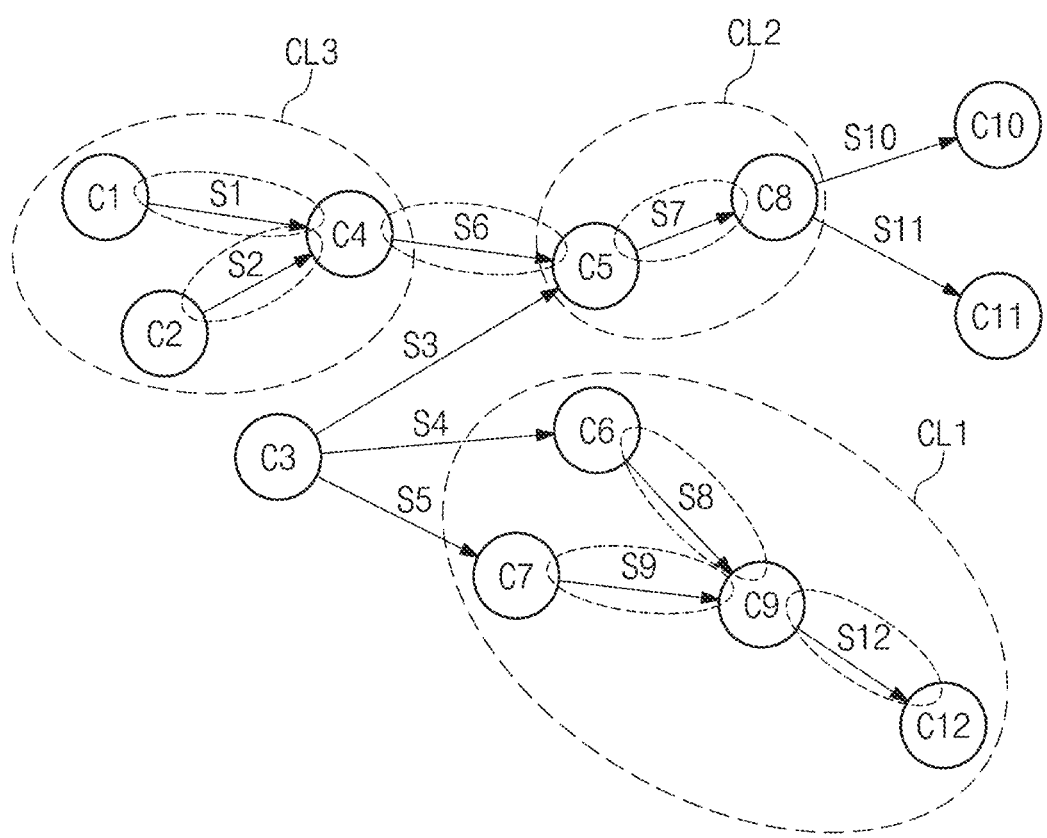
FIG. 9 is a diagram for describing operation S124 of FIG. 3.

FIG. 9 is a non-limiting example diagram for describing operation S124 of FIG. 3. FIG. 9 is a diagram illustrating a cluster generated as a result of tracking of FIG. 8. Referring to FIG. 9, first to third clusters CL1, CL2, and CL3 are illustrated based on the directed graph. The first to third clusters CL1, CL2, and CL3 respectively correspond to the first to third clusters of FIG. 8, respectively.

A first cluster CL1 includes the sixth cell C6, the seventh cell C7, the ninth cell C9, and the twelfth cell C12. In the placing of the cells, the sixth cell C6, the seventh cell C7, the ninth cell C9, and the twelfth cell C12 may be placed adjacent to one another, or may be placed close to one another. A second cluster CL2 includes the fifth cell C5 and the eighth cell C8. In the placing of the cells, the fifth cell C5 and the eighth cell C8 may be placed adjacent to each other, or may be placed close to one another. A third cluster CL3 includes the first cell C1, the second cell C2, and the fourth cell C4. In the placing of the cells, the first cell C1, the second cell C2, and the fourth cell C4 may be placed adjacent to one another, or may be placed close to one another.

The third cell C3, the tenth cell C10, and the eleventh cell C11 that are not included in the first to third clusters CL1 to CL3 may be placed freely under the design rule of the design tool 122 of FIG. 1. In an example embodiment, the third cell C3 may be placed at a position determined based on the timing criticality of the signal transfer path that includes a third path S3 and/or the timing criticality of the signal transfer path that includes a fourth path S4 (or a fifth path S5).

Figure 10:
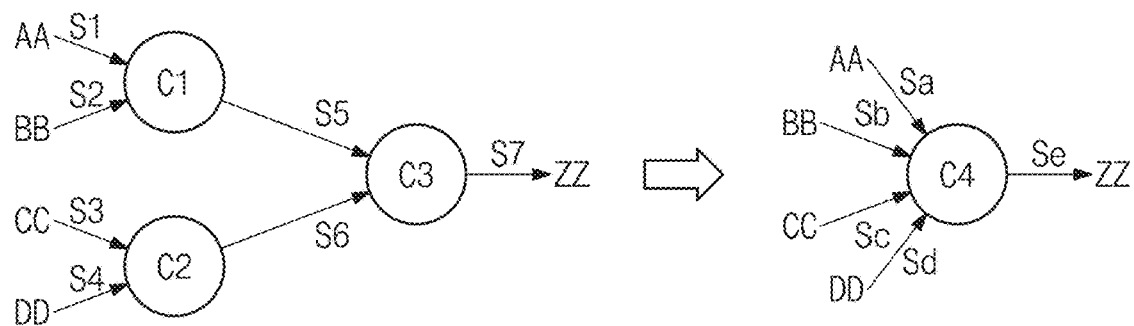
FIG. 10 is a diagram illustrating an example embodiment in which a cluster by FIGS. 1 to 3 is used in a design of a semiconductor circuit.

FIG. 10 is a diagram illustrating an example embodiment in which a cluster by FIGS. 1 to 3 is used in a design of a semiconductor circuit. FIG. 10 is a non-limiting diagram for describing an example process of creating and/or developing a new cell, based on instances or cells included in a cluster. This process may be performed in the system 100 of FIG. 1, and may be performed in the design tool 122 of FIG. 1, for example.

Referring to FIG. 10, first to third cells C1 to C3 and first to seventh paths S1 to S7 are illustrated. The first to third cells C1 to C3 are assumed to be included in one cluster. An input terminal of the first cell C1 is connected to the first path S1 and the second path S2, and an output terminal of the first cell C1 is connected to the fifth path S5. An input terminal of the second cell C2 is connected to the third path S3 and the fourth path S4, and an output terminal of the second cell C2 is connected to the sixth path S6. An input terminal of the third cell C3 is connected to the fifth path S5 and the sixth path S6, and an output terminal of the third cell C3 is connected to the seventh path S7. That is, the out-degree of cells C1, C2, and C3 are each one, while an in-degree of each of cells C1, C2, and C3 is two.

The first to third cells C1 to C3 convert signals input, based on the first to third conversion functions f1 to f3, respectively. When a first signal AA is input to the first path S1, a second signal BB is input to the second path S2, a third signal CC is input to the third path S3, and a fourth signal DD is input to the fourth path S4, a fifth signal ZZ may be output to the seventh path S7. This may be represented as the equation ZZ=f3 (f1 (AA, BB), f2 (CC, DD)).

The system 100 of FIG. 1 may convert the instances (or cells) included in the cluster into one instance (or cell). Such conversion may be performed automatically or manually in the system 100. For example, the conversion of the cluster may be performed based on the frequency at which the same cluster as the first to third cells C1 to C3 is generated. In FIG. 10, the first to third cells C1 to C3 may be converted into a fourth cell C4 that outputs a fifth signal ZZ through one output path Se when the first to fourth signals AA, BB, CC, and DD are received through four input paths Sa, Sb, Sc, and Sd. The fourth cell C4 is, or corresponds to, a single cell that satisfies ZZ=f4 (AA, BB, CC, DD) and may be defined in the cell library.

According to the definition of the cluster, new cells that are required or used in the semiconductor circuit may be easily developed. Alternatively or additionally, the design tool 122 may place the fourth cell C4 that has a set area and an internal placement relation, at an optimized or improved position. In the case where the fourth cell C4 is defined, compared the case where the first to third cells C1 to C3 are not placed adjacent to or close to one another by freely placing the first to third cells C1 to C3, an area, a length of the wiring, a maximum or large frequency characteristic, a total negative slack (TNS) characteristic, and/or the like of the semiconductor circuit may be improved.

Figure 11:
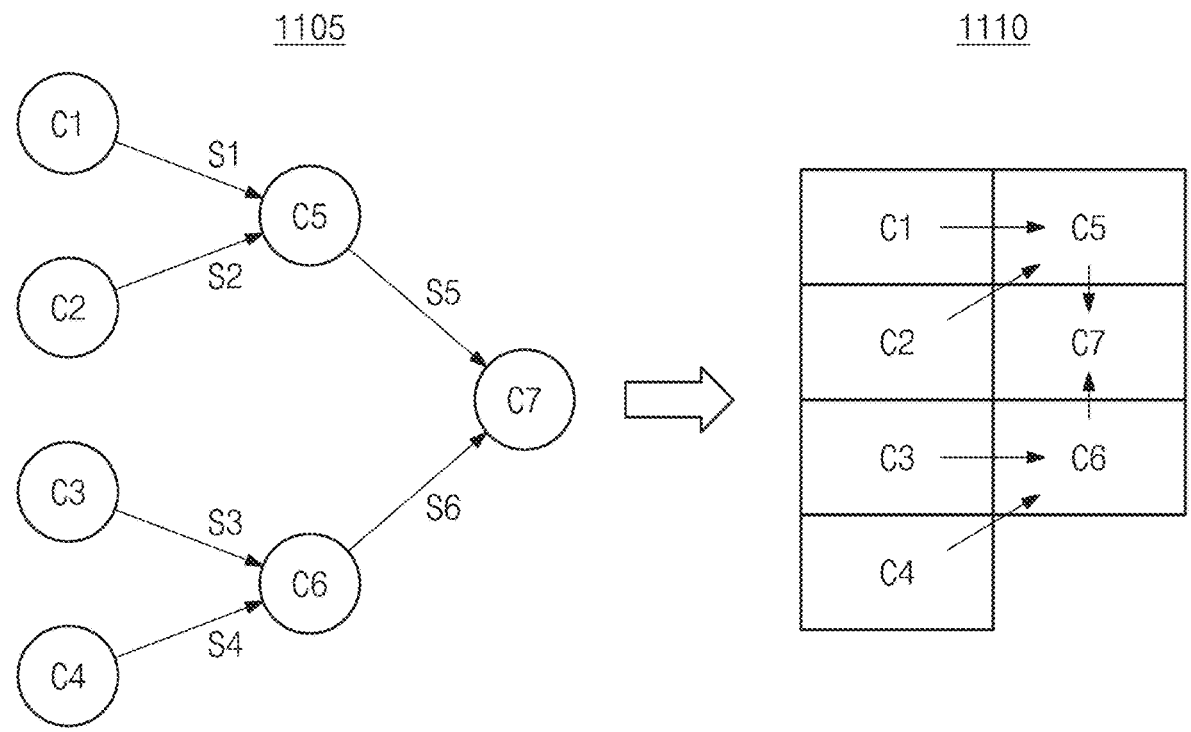
FIG. 11 is a diagram illustrating an example embodiment in which a cluster by FIGS. 1 to 3 is used in a design of a semiconductor circuit.

FIG. 11 is a diagram illustrating an example embodiment in which a cluster by FIGS. 1 to 3 is used in a design of a semiconductor circuit. FIG. 11 is a diagram for describing an example process of determining a relative position between cells included in a cluster. This process may be performed in the system 100 of FIG. 1, and may be performed in the design tool 122 of FIG. 1, for example.

Referring to FIG. 11, first to seventh cells C1 to C7 and first to sixth paths S1 to S6 are illustrated. A directed graph 1105 illustrates the relation of the cells C1 to C7 and paths S1 to S6, while a layout 1110 illustrates a two-dimensional location of first to seventh cells C1 to C7. The first to seventh cells C1 to C7 are assumed to be included in one cluster. The first cell C1 and the second cell C2 are connected to the fifth cell C5 through the first path S1 and the second path S2, respectively. The third cell C3 and the fourth cell C4 are connected to the sixth cell C6 through the third path S3 and the fourth path S4, respectively. The fifth cell C5 and the sixth cell C6 are connected to the seventh cell C7 through the fifth path S5 and the sixth path S6, respectively. That is, the in-degree of each of the fifth cell C5, the sixth cell C6, and the seventh cell C7 may be two, while the out-degree of each of the first cell C1 to the sixth cell C6 may be one.

Two cells that are connected through the first to sixth paths S1 to S6 are determined to have the strong relation in the clustering process. Therefore, two cells that are connected through the first to sixth paths S1 to S6 are required to, or desired to, be disposed adjacent to each other. Accordingly, the design tool 122 may determine the relative placement between cells in the cluster by considering the first to sixth paths S1 to S6 (or the first to sixth nets) and a position of the terminal of each of the first to seventh cells C1 to C7. For example, reviewing the layout 1110, the first cell C1 and the second cell C2 are placed adjacent to the fifth cell C5 in a lateral direction, the third cell C3 and the fourth cell C4 are placed adjacent to the sixth cell C6 in the lateral direction, and the seventh cell C7 may be placed between the fifth cell C5 and the sixth cell C6.

According to the definition of the cluster, the placement of cells that have the strong relation in the semiconductor circuit may be optimized or improved. In the case where the relative positions of the first to seventh cells C1 to C7 are predetermined (or, alternatively, specified) based on the cluster, compared to the case where the first to seventh cells C1 to C7 are freely placed, the area, the length of the wiring, the maximum frequency characteristic, the total negative slack (TNS) characteristics, and the like of the semiconductor circuit may be improved. Thus, as shown in the layout 1110 of the first cell C1 to the seventh cell C7 may improve performance characteristics.

Figure 12:
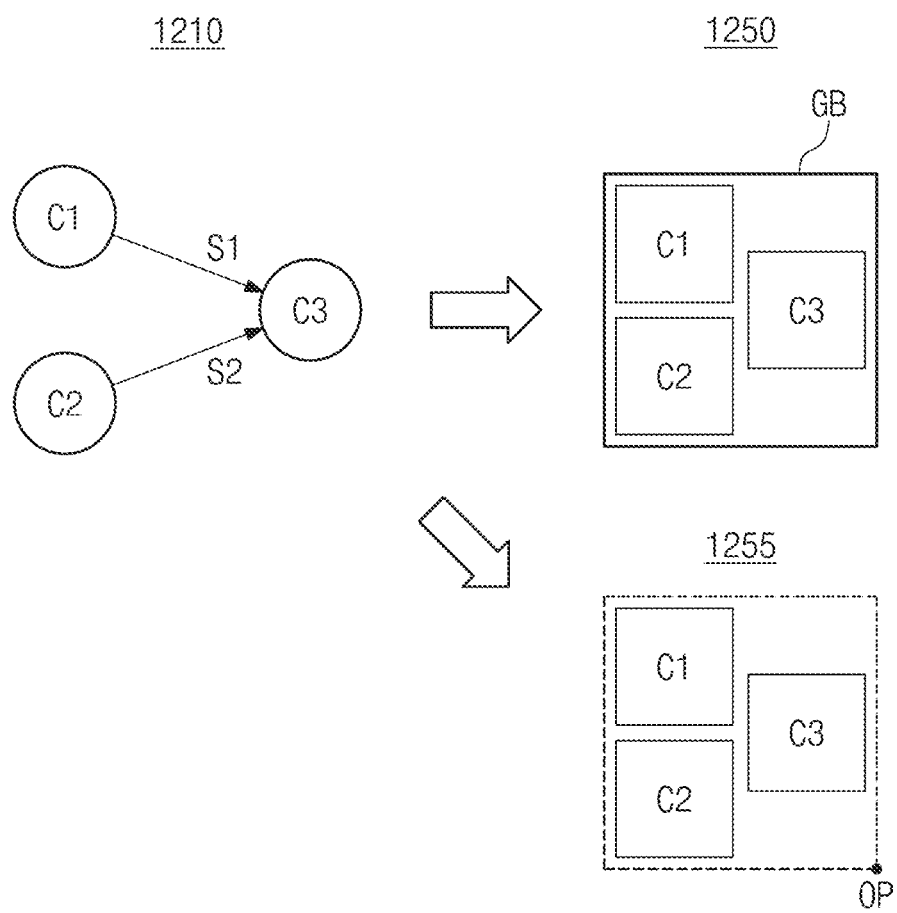
FIG. 12 is a diagram illustrating an example embodiment in which a cluster by FIGS. 1 to 3 is used in a design of a semiconductor circuit.

FIG. 12 is a diagram illustrating an example embodiment in which a cluster by FIGS. 1 to 3 is used in a design of a semiconductor circuit. FIG. 12 is a diagram for describing an example process of inducing adjacent placement between cells included in a cluster. The process of FIG. 12 does not determine the relative position between the cells included in the cluster, and guarantees free placement of the design tool 122 of FIG. 1, but may give limiting condition on the placement between the cells. This process may be performed in the system 100 of FIG. 1, and may be performed in the design tool 122 of FIG. 1, for example.

Referring to FIG. 12, first to third cells C1 to C3 and first and second paths S1 and S2 are illustrated as non-limiting examples in a directed graph 1210. The first to third cells C1 to C3 are assumed to be included in one cluster. The first cell C1 and the second cell C2 are connected to the third cell C3 through the first path S1 and the second path S2, respectively. In the clustering process the first cell C1 and the third cell C3 are determined to have the strong relation, and the second cell C2 and the third cell C3 have the strong relation. Therefore, the first cell C1 and the second cell C2 are required to, or desired to, be placed adjacent to the third cell C3.

In an example embodiment, the design tool 122 of FIG. 1 may set a boundary GB of the cluster, as illustrated in layout 1250. The first to third cells C1 to C3 may be designated to be placed within the set boundary GB. The boundary GB may induce the first to third cells C1 to C3 to be placed adjacent to each other. Therefore, in the case where the first to third cells C1 to C3 are placed within the set boundary GB, compared to the case where the first to third cells C1 to C3 are freely placed, the area, the length of the wiring, and characteristics of the semiconductor circuit may be improved.

For example, the design tool 122 of FIG. 1 may set an origin point OP corresponding to the cluster in layout 1255. The first to third cells C1 to C3 may move together as the origin point OP moves. Therefore, when a certain cell needs to be moved to another location, other cells in the cluster may also move together. The origin point OP may induce the cells in the cluster to be placed adjacent to each other. Therefore, in the case where the first to third cells C1 to C3 move together as the origin point OP moves, compared to the case where the first to third cells C1 to C3 are freely placed, the area, the length of the wiring, and characteristics of the semiconductor circuit may be improved.

Figure 13:
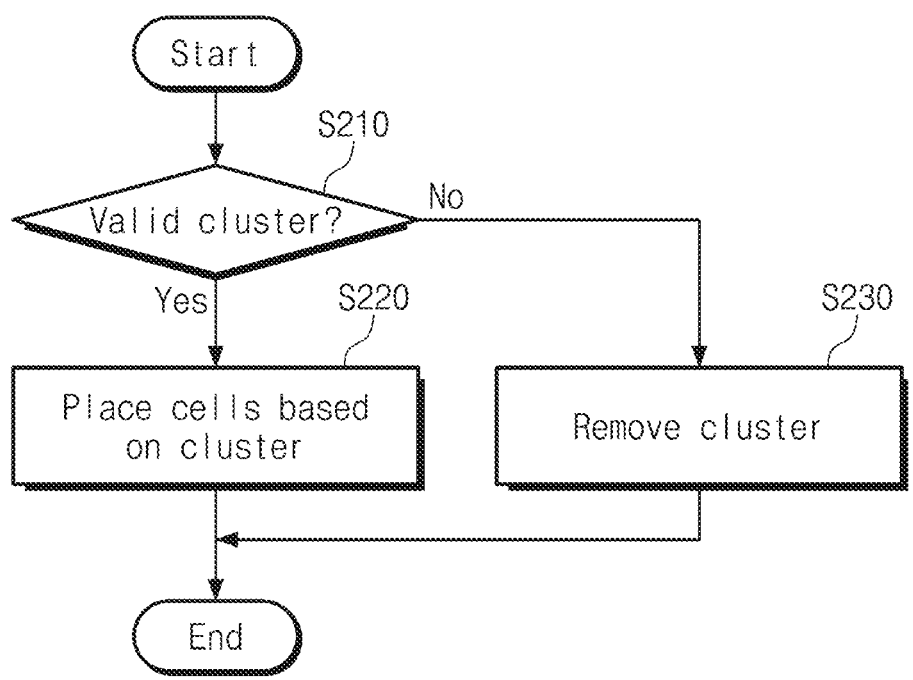
FIG. 13 is a flowchart illustrating an example embodiment in which a cluster by FIGS. 1 to 3 is selectively used in a design of a semiconductor circuit.

FIG. 13 is a flowchart illustrating an example embodiment in which a cluster by FIGS. 1 to 3 is selectively used in a design of a semiconductor circuit. Since the cluster limits the placement of cells in designing of semiconductor circuit, a run time for cell placement of the design tool 122 may be relatively long, and/or a pin pattern may be concentrated in a specific area that does not comply with the design rule. In above case, the cluster may be removed automatically. Each operation of FIG. 13 may be performed in the system 100 of FIG. 1, and may be performed in the design tool 122 or the clustering application 121 of FIG. 1, for example.

In operation S210, the system 100 determines whether a defined cluster is a valid cluster. When the defined cluster satisfies a specific condition, the system 100 determines that the defined cluster is the valid cluster. In this case, operation S220 is performed. When the defined cluster does not satisfy the specific condition, the system 100 determines that the defined cluster is not the valid cluster. In this case, operation S230 is performed. Examples of the specific condition will be described below.

In an example embodiment, the specific condition may be a pin density. The system 100 may calculate an area of the cluster. The area of the cluster depends on the area of cells in the cluster and the area for connection among the cells. The system 100 may calculate a density of a pin pattern for the connection among the cells, based on the area of the cluster. When the calculated density exceeds a reference value, the system 100 may determine that the pin pattern is excessively concentrated in the specific area, and may determine that the defined cluster is not the valid cluster.

In an example embodiment, the specific condition may be a depth of the directed graph. The system 100 may define start point (start instance, start cell) and end point (end instance, end cell) within the cluster. The start point may be defined as at least one cell in which the signal transfer path is started in the cluster. The end point may be defined as at least one cell in which the signal transfer path is terminated in the cluster. When the maximum depth or a large depth of the graph that depends on the number of cells passing through the signal transfer path exceeds the reference value, the system 100 may determine that the cluster is excessively large. In this case, the system 100 may determine that the cluster is not the valid cluster.

In an example embodiment, the specific condition may be a total area of the cells. When the total area of all cells corresponding to the cluster exceeds the reference area, system 100 may determine that the cluster is excessively large. In this case, the system 100 may determine that the cluster is not the valid cluster.

The system 100 may determine at least one of the conditions described above to determine the validity of the cluster. Alternatively or additionally, when the cluster does not satisfy at least one of the conditions described above, the system 100 may determine that the cluster is not the valid cluster. Alternatively or additionally, when the cluster does not satisfy all of the conditions described above, the system 100 may determine that the cluster is not the valid cluster. In addition, the validity of the cluster may be determined based on various conditions.

In operation S220, the system 100 may place the cells, based on the valid cluster. The placement of these cells may be performed as described in operation S130 of FIG. 2.

In operation S230, the system 100 may remove the cluster that is determined to be invalid. Accordingly, performance reduction such as violations of design operation time, and/or design rules may be improved.

Figure 14:
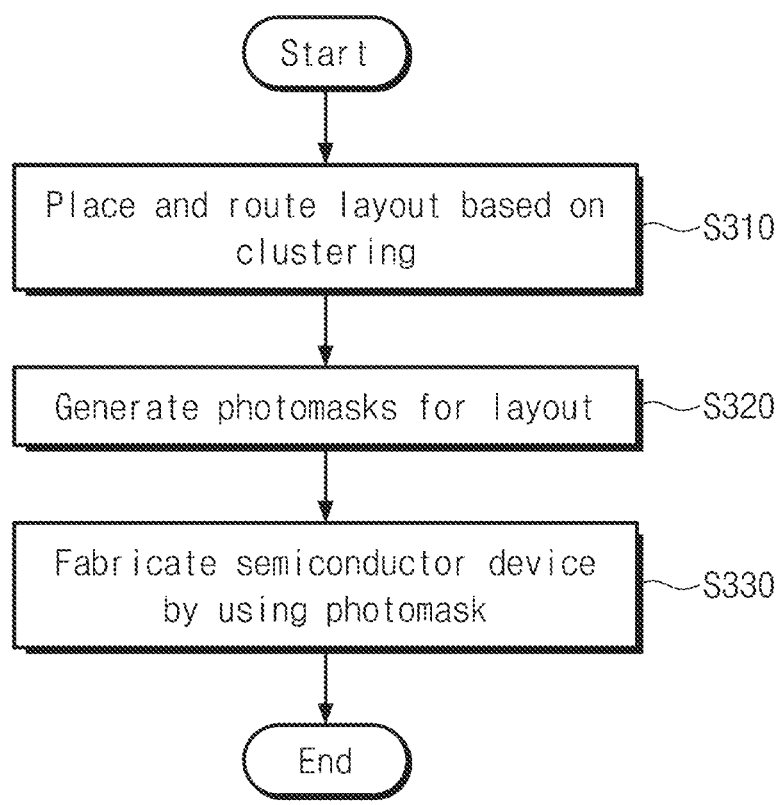
FIG. 14 is a flowchart illustrating an example embodiment in which a semiconductor device is fabricated using a design of the semiconductor circuit.

FIG. 14 is an example flowchart for the fabrication of a semiconductor device, according to some non-limiting example embodiments.

Referring to FIG. 14, in step S310, a layout of a semiconductor device may be generated based on the system described with reference to FIGS. 1-13.

In step S320, a plurality of photomasks may be generated, e.g. may be written, based on the layout produced in step S310.

In step S330, a semiconductor device may be fabricated by using the photomasks generated in step S320.

According to a system for designing a semiconductor circuit and an operating method of the same according to an example embodiment of inventive concepts, by creating a cluster in consideration of the connection relation between cells, adjacent placement of cells having a strong relation may be induced.

In addition, according to a system for designing a semiconductor circuit and an operating method of the same according to an example embodiment of inventive concepts, placement of cells may be automatically optimized or improved such that an area of the semiconductor circuit and a length of the wiring may be reduced, and the performance may be improved.

The contents described above are specific embodiments for implementing inventive concepts. Inventive concepts may include not only the embodiments described above but also embodiments in which a design is simply or easily capable of being changed. In addition, inventive concepts may also include technologies easily changed to be implemented using embodiments.

What is claimed is:

1. A system for designing a semiconductor circuit, the system comprising:
   a working memory configured to load machine-readable instructions for generating a cluster, based on instances respectively corresponding to cells of the semiconductor circuit, and for placing the cells; and
   a central processing unit configured to execute the machine-readable instructions for clustering and placing that, when executed by the central processing unit, cause the system to,
   in response to an output terminal of a first instance being connected to a second instance and a number of instances connected to the output terminal of the first instance being one, classify the first instance and the second instance into a candidate group pair, and
   in response to all instances connected to an input terminal of the second instance being classified into the candidate group pair with the second instance, generate the cluster including the first instance and the second instance and provide a design tool with the cluster.

2. The system of claim 1, wherein, in response to an output terminal of a third instance being connected to the second instance and the number of instances connected to the output terminal of the third instance being one, the system classifies the third instance and the second instance into the candidate group pair, and generates the cluster that further includes the third instance.

3. The system of claim 1, wherein, in response to all instances connected to an input terminal of the first instance being classified into the candidate group pair, the system generates the cluster that further includes a third instance connected to the input terminal of the first instance.

4. The system of claim 1, wherein the central processing unit executes machine readable instructions to generate a directed graph proceeding from at least one output terminal of the instances to at least one input terminal of the instances, and classifies the candidate group pair based on the directed graph.

5. The system of claim 4, wherein the central processing unit executes machine readable instructions to track the candidate group pair in a direction that proceeds from the at least one input terminal to the at least one output terminal, to determine the cluster.

6. The system of claim 1, wherein the central processing unit executes machine readable instructions to place a first cell corresponding to the first instance and a second cell corresponding to the second instance adjacent to each other.

7. The system of claim 1, wherein the central processing unit executes machine readable instructions to convert the cluster into one instance.

8. The system of claim 1, wherein the central processing unit executes machine readable instructions to determine a relative position between a first cell corresponding to the first instance and a second cell corresponding to the second instance, based on the cluster.

9. The system of claim 1, wherein the central processing unit executes machine readable instructions to determine a bounding box of the cluster and places the cells corresponding to the cluster in the bounding box.

10. The system of claim 1, wherein the central processing unit executes machine readable instructions to determine an origin point corresponding to the cluster, and moves the cells corresponding to the cluster, based on a movement of the origin point.

11. A method of operating a system for designing a semiconductor circuit, the method comprising:
    receiving a netlist including instances respectively corresponding to cells of the semiconductor circuit;
    classifying, in response to a number of a first instance that is connected to an output terminal of a second instance being one, the first instance and the second instance into a candidate group pair;
    determining whether at least one instance connected to an input terminal of the first instance is classified into the candidate group pair together with the first instance;
    determining a target instance that is included in a cluster, based on a determined result of the at least one instance; and
    fabricating a semiconductor device based on the determined result of the at least one instance.

12. The method of claim 11, wherein the determining of the target instance that is included in the cluster includes
    determining the first instance and the second instance as the target instance, in response to the number of the at least one instance being one and the at least one instance being the second instance.

13. The method of claim 11, wherein the determining of the target instance that is included in the cluster includes, excluding the second instance from the target instance, in response to the at least one instance including the second instance and a third instance, and the third instance and the first instance not being classified as the candidate group pair.

14. The method of claim 11, wherein the determining of the target instance that is included in the cluster includes, in response to all instances connected to the input terminal of the first instance being classified into the candidate group pair together with the first instance, determining the all instances connected to the input terminal and the first instance as the target instance.

15. The method of claim 11, further comprising:

calculating an area of the cluster depending on an area of target cells corresponding to instances that is determined as the target instance;

calculating a density of a pin pattern for connecting the target cells, based on the area of the cluster; and removing the cluster when the density exceeds a reference density.

16. The method of claim 11, further comprising:

defining a start instance of which an input terminal is not connected to the target instance, in the cluster;

defining an end instance of which an output terminal is not connected to the target instance, in the cluster; and removing the cluster when a maximum depth between the start instance and the end instance exceeds a reference depth.

17. The method of claim 11, further comprising:

removing the cluster when a total area of cells corresponding to the cluster exceeds a reference area.

18. The method of claim 11, further comprising:

generating a directed graph proceeding from at least one output terminal of the instances to at least one input terminal of the instances, based on the netlist, wherein the instances that are classified into the candidate group pair are determined with reference to the directed graph.

19. The method of claim 11, further comprising:

generating at least one photomask based on the determined result of the at least one instance.

20. A method of operating a system for designing a semiconductor circuit, the method comprising:

receiving a netlist that includes instances respectively corresponding to cells of the semiconductor circuit and nets connecting the instances;

generating a directed graph such that each of the nets is connected between two instances and has a directionality corresponding to a signal transfer direction of the instances;

classifying, in response to a number of nets connected to an output terminal of a first instance of the instances being one, the net into a candidate group net;

generating a cluster including the first instance and a second instance connected to the net, in response to all nets connected to an input terminal of the second instance being classified as the candidate group net; and placing a first cell corresponding to the first instance and a second cell corresponding to the second instance adjacent to each other, based on the cluster.

* * * * *